UNITED STATES PATENT OFFICE.

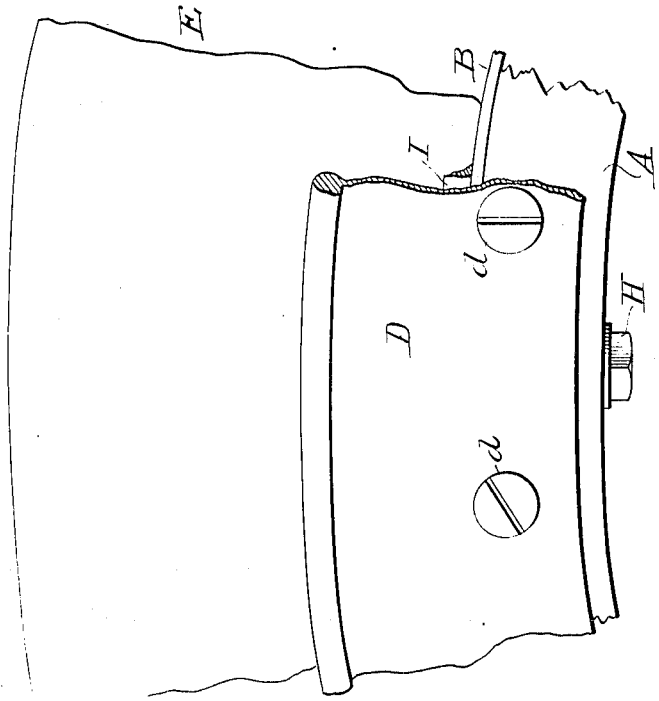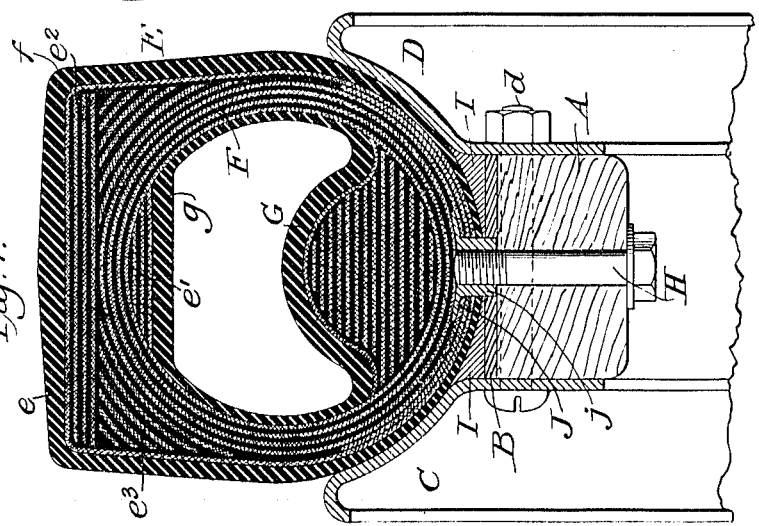

HENRY G. FISKE, OF NEW YORK, N. Y., ASSIGNOR, BY MESNE ASSIGNMENTS, TO THE COLUMBIA MOTOR CAR COMPANY, OF HARTFORD, CONNECTICUT, A CORPORATION OF CONNECTICUT.

TIRE.

1,040,920.  Specification of Letters Patent.  Patented Oct. 8, 1912.

Application filed July 1, 1899. Serial No. 722,526.

*To all whom it may concern:*

Be it known that I, HENRY G. FISKE, a citizen of the United States of America, and resident of the city of New York, county of New York, and State of New York, have invented certain new and useful Improvements in Tires, of which the following is a specification.

My invention relates to improvements in tires and it comprises a tire of special construction in which a number of practical advantages are embodied. The particular form of tire hereinafter described resembles in some particulars that shown, described and claimed in a separate application for Letters Patent filed by me, particularly Serial No. 714,160, filed April 24, 1899, which shows interior riding cushions integral with the construction of the tire, but also embodies additional and other features of improvement as will appear particularly as set forth in the drawing or from the following description and be more particularly pointed out in the appended claims.

While it will be seen that some of the features, or some of the combinations of elements of novelty herein shown, described or claimed, may be embodied in pneumatic tires, or in the form of pneumatics known as hose-pipe tires, it will also be seen that certain of these elements or novel combinations are by no means limited to any particular class of tire, but on the contrary my invention may be practised in the construction or use, or adapted in any form or type of tire, while likewise various attaching means for securing the tire to the rim or felly might be used in combination with certain of my improvements. I have preferred, however, to show and describe them as combined in one particular form for illustration.

In the accompanying drawings, I have illustrated an embodiment of my invention for improvements in a particular type of tire of which Figure 1 shows a transverse sectional elevation of a pneumatic tire in place as combined with a rim of wheel. Fig. 2 is a side elevation of a portion of the tire and rim shown in Fig. 1.

A is a felly, preferably of wood and strengthened and reinforced by a metallic band B secured upon its periphery.

C D are outwardly flaring metallic flanges having inner portions which are fitted against and parallel with the sides of the felly A being secured thereto by transverse bolts *d* passing through the felly and both flanges and serving to detachably secure them to the felly so that one or both may be removed at will, a result which is readily secured by placing the heads of alternate bolts in opposite directions, so that by removing one of the bolts either flange C or D can be detached, the remaining flange being held in position by the heads of the bolts upon that side, the ends of said bolts upon the opposite sides having been withdrawn to permit of removal of said opposite flange.

The tire E is of the hose-pipe type and is preferably formed with a flat tread *e*. The main body of the tire is composed of a plurality of layers F of fabric interspersed with thin layers of rubber, the whole being vulcanized together in the usual manner to produce a strong one-piece tire. That is the several component parts of the tire are vulcanized together and form a single piece tire which is of the pneumatic type in contradistinction to a cushion tire, and has, of course, on its inner periphery an air tight lining tube, hereafter described, through which air cannot pass. Before the tire E is completed, an arch shaped rib or strip G is placed upon its interior and secured in position upon the side next to the rim and this piece G I term a riding cushion, its office being to support the outer or tread portion of the tire clear of the edges of the rim in the event of complete deflation of the tire so that it will be practicable to use the wheel to some extent after deflation without destruction of the tire. This riding cushion or arched shaped rib G coöperates with an oppositely disposed, substantially flat surface of the tubular portion of the tire. This arrangement of a convex rib coöperating with an oppositely disposed flat surface, provides a riding cushion which has material advantages inasmuch as there is little liability of the two surfaces sticking when they are brought into contact. Furthermore, there is always an air space left about the riding cushion and when the tire is deflated bringing the two inner surfaces together, a slight rocking motion is permitted between the surfaces which would prevent sticking, and at the same time the air which remains in the tube is given plenty of room to move freely under the action of the compressed portions of the tire. Additional pieces *e′* of fabric and rubber are fitted on the inside of the tread of the tire so as to materially thicken and strengthen the same, and an air tight lining or tube of soft rubber *g* is then secured within the tire covering the inside of the filling *e'* and extending over the riding cushion substantially as indicated. Several layers of fabric and rubber *e²* are placed across the upper part or tread of the tire E to form the flat tread before referred to, and the corner spaces upon each side of the tire below the outer portions of the fabric *e²* are filled in with additional layers *e³* of fabric and rubber so that the flattened tread portion of the tire is amply supported and at the same time a greatly increased thickness of puncture-resisting material is presented to the surface over which the wheel moves.

As will be seen the fabric in the tread extends into the body of the tire, that is the sides and other portions, and the fabric and rubber merging as they do in the whole structure from tread to sides and through to the seat, causes uniformity as a whole with no joint tending to start rupture; the difficulty of such rupture is inherent in any structure in which it is attempted to attach a finished tread portion or a tread portion complete in itself, to a casing complete in itself.

The outwardly flaring portions of the flanges C and D conform to the rounded shape of the lower part of the tire which may be as usual. The center lower part of the tire rests upon the plate B upon the periphery of the felly A and the spaces between that point and the points of contact between the underside of the tire and the flanges C. D. are closed by filling bands I I which may be coated with cement to assist in holding the tire in position.

The tire in the form illustrated is principally secured in position by means of thin metallic plates J which are embedded between the layers of fabric on the inner side of the tire and said plates are provided with outwardly extending screw threaded nipples *j* which are engaged by screw bolts H passing through the felly, as indicated.

It will be obvious that the various features of novelty may be differently embodied than as illustrated, or the novel elements may be combined differently than as illustrated, and therefore that various modifications of structure are within the intent of my invention or the improvements may be adapted to various forms and types of tire combined with various rims.

Without limiting myself to the exact embodiment of my invention herein set forth, what I claim is:

1. A non-collapsible continuous pneumatic tire comprising a substantially flat tread portion and a seat portion, layers of fabric permanently embodied in said tire, an outer layer thereof extending from the tread portion down the sides, another layer substantially parallel with the tread portion, another layer substantially circular, a riding cushion arranged adjacent to the seat portion and having its central portion raised, and an oppositely disposed interior surface coöperating with said riding cushion and adapted, when the tire is deflated, to provide air space on either side of the engaging cushion surface.

2. In a non-collapsible pneumatic tire, a pair of coöperating riding cushions causing protruding internal surfaces oppositely disposed, one adjacent to the seat portion and the other adjacent to the tread portion, the surface adjacent to the seat portion being substantially convex, the surface adjacent to the tread portion being substantially parallel to said tread portion, and an outward exterior surface built up, producing a flat tread of substantially equal stiffness with the balance of the structure of the tire.

3. A vehicle tire, including a tubular casing having a substantially flat tread, said casing and tread being formed of fabric and rubber laid in layers and molded into an integral unit, at least one layer of said fabric lying adjacent to and substantially parallel with the outer flat surface of said tread, and other layers thereof disposed cylindrically in the tire body.

4. A vehicle tire including a tubular casing having a substantially flat tread, said casing and tread being formed of fabric and rubber laid in layers and molded into an integral unit, at least one layer of said fabric lying adjacent to and substantially parallel with the outer flat surface of said tread, oppositely disposed surfaces protruding from the interior of said casing, one of said surfaces being adjacent said tread, and an air tight lining covering the inner surface of said casing.

5. A tire built up of a series of webs of fabric and rubber, and including an outer flat wearing surface and an inner elastic coating, said coating adjacent to the tread portion being substantially parallel thereto, an oppositely disposed convex portion within the tire and adjacent to the seat portion, at least one layer of said fabric extending across the tread portion and down either side, and at least one layer of said fabric constituting in effect a complete tubular casing, means for holding the tire against lateral displacement, and means for holding it positively in engagement with the felly.

6. A pneumatic tire for vehicles, comprising a broad flat tread portion, an air chamber having its outer surface substantially parallel to the tread portion, the distance between the outer surface of the air chamber and the outer surface of the tread portion being greater than the thickness of the other portions of the tire, a tubular body fabric, embedded in the rubber, and outwardly extending portions of rubber and fabric between the tubular body portion and the flat tread portion.

7. A tire for vehicles including an air chamber, a sheathing including fabric and rubber, the lateral walls thereof embodying layers of fabric extending from the side portions to and across the tread portion and coöperating excess rubber portion and fabric integrally formed with the main fabric body, supporting and constituting a flat tread of width substantially equal to the seat of the tire, and a layer of fabric substantially parallel with the flat tread.

8. A tire for vehicles having a broad flat tread portion integrally embodied with the casing, coöperating layers of fabric in said casing extending from the tread portion to the sides of the casing, an inflatable pneumatic tube within said casing, means for securing the seat of said tire against lateral displacement from the felly, including a lateral detachable rim.

Signed by me at New York, N. Y., this 30th day of June, 1899.

HENRY G. FISKE.

Witnesses:
FRANKLAND JANNUS,
J. S. DE SELDING.